(12) United States Patent
Chen et al.

(10) Patent No.: US 9,335,470 B2
(45) Date of Patent: May 10, 2016

(54) OPTO-ELECTRONIC CIRCUIT BOARD AND METHOD FOR ASSEMBLING THE SAME

(71) Applicant: Unimicron Technology Corp., Taoyuan (TW)

(72) Inventors: Yin-Ju Chen, Taoyuan (TW); Cheng-Po Yu, Taoyuan (TW); Pei-Chang Huang, Taoyuan (TW)

(73) Assignee: UNIMICRON TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 14/490,688

(22) Filed: Sep. 19, 2014

(65) Prior Publication Data

US 2015/0362674 A1  Dec. 17, 2015

(30) Foreign Application Priority Data

Jun. 17, 2014  (TW) .............................. 103120869 A

(51) Int. Cl.
*G02B 6/122* (2006.01)
*G02B 6/13* (2006.01)

(52) U.S. Cl.
CPC  *G02B 6/122* (2013.01); *G02B 6/13* (2013.01); *Y10T 29/49131* (2015.01)

(58) Field of Classification Search
CPC ..... G02B 6/122; G02B 6/13; Y10T 29/49131
See application file for complete search history.

(56) References Cited

U.S. PATENT DOCUMENTS 6,491,447 B2    12/2002   Aihara et al.

FOREIGN PATENT DOCUMENTS

| TW | 201044041 A |   | 12/2010 |   |         |
|----|-------------|---|---------|---|---------|
| TW | 201142390 A |   | 12/2011 |   |         |
| TW | 201316062 A | * | 4/2013  | . | G02B 6/42 |
| TW | 201316062 A |   | 4/2013  |   |         |
| TW | 201331656 A |   | 8/2013  |   |         |
| TW | 201418808 A |   | 5/2014  |   |         |

* cited by examiner

*Primary Examiner* — Yasser A Abdelaziez
*Assistant Examiner* — Farun Lu
(74) *Attorney, Agent, or Firm* — CKC & Partners Co., Ltd.

(57) ABSTRACT

A method for assembling an opto-electronic circuit board is described as follows. A bottom cladding layer, a core layer and a top cladding layer are formed on the base orderly such that a waveguide is completed. A first light-guide hole is formed in a base material, and a light source is disposed on the base material thereby forming an emission component. A second light-guide hole is formed in another base material, and then an optic receiver is disposed on another base material thereby forming a receiver component. A circuit substrate is processed in order to form a first cavity, a second cavity and a third cavity on a first circuit layer of the substrate. The waveguide, the emission component and the receiver component are disposed respectively in the first cavity, the second cavity and the third cavity.

10 Claims, 8 Drawing Sheets

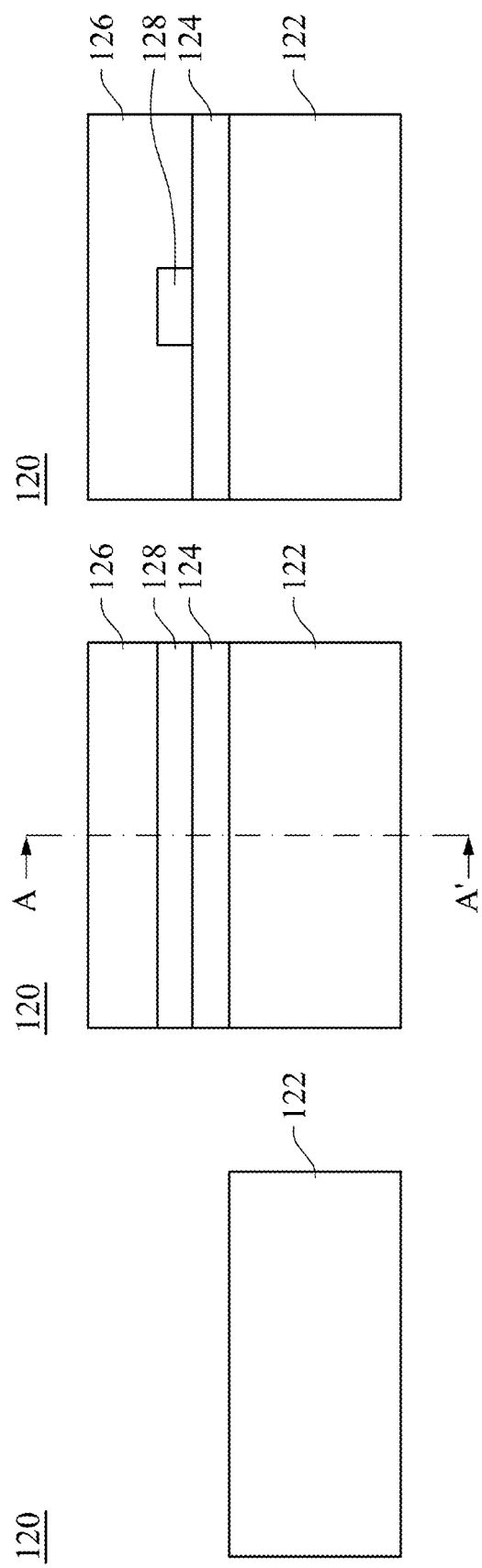

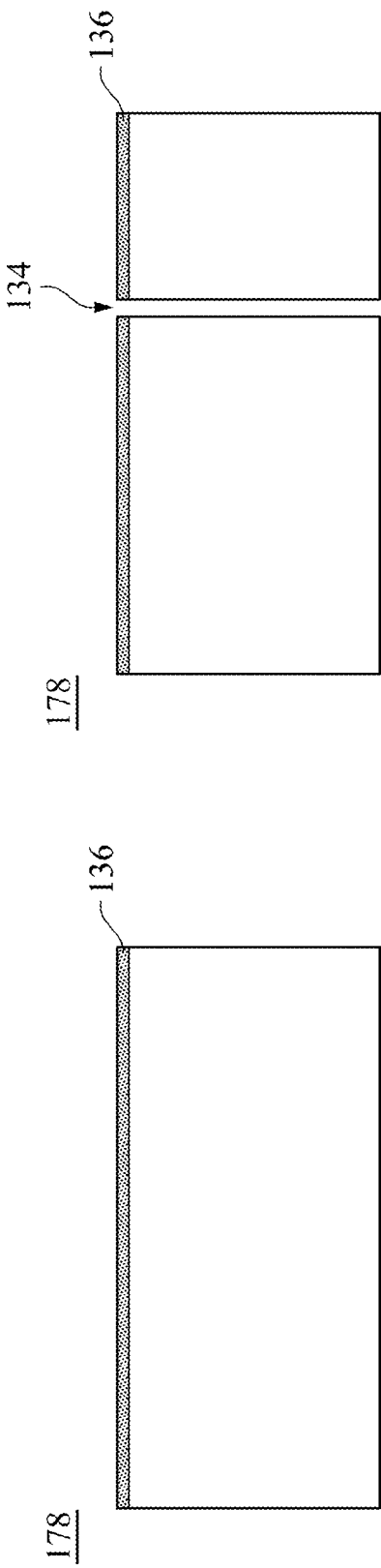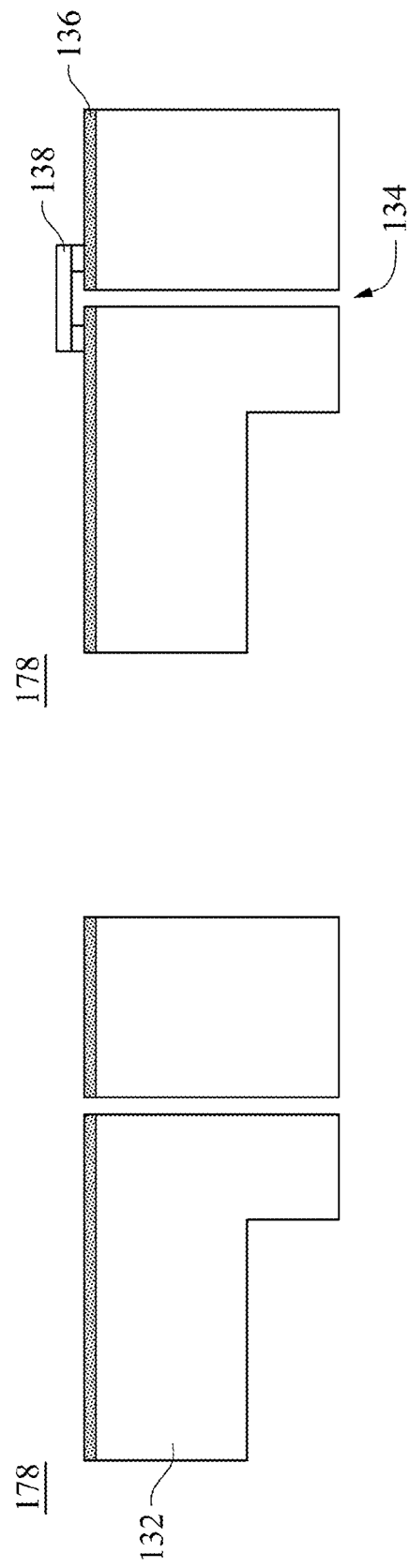

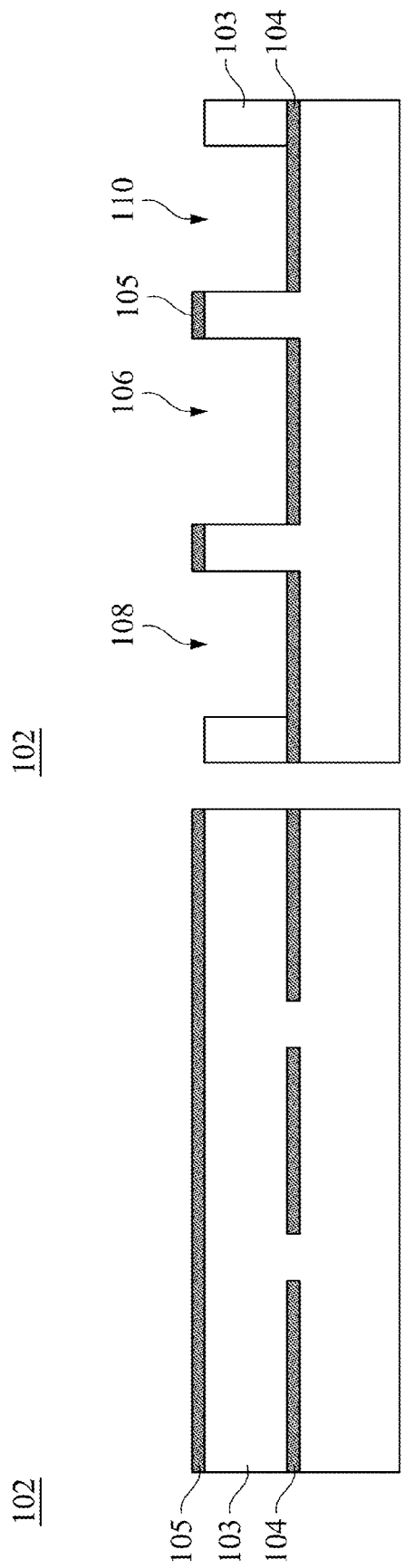

OPTO-ELECTRONIC CIRCUIT BOARD AND METHOD FOR ASSEMBLING THE SAME

RELATED APPLICATIONS

This application claims priority to Taiwan Application Serial Number 103120869, filed Jun. 17, 2014, which is herein incorporated by reference.

BACKGROUND

1. Field of Invention

The present invention relates to an opto-electronic circuit board and a method for assembling the same. More particularly, the present invention relates to an embedded opto-electronic circuit board and a method for assembling the same.

2. Description of Related Art

With a development of the data processing, the data transmission speed of a bus has gradually fallen behind the data calculation speed of a central processing unit (CPU). Therefore, an optic signal transmission has been implemented and a waveguide configured for guiding the optic signal is introduced into an opto-electronic circuit board.

In a conventional opto-electronic circuit board, the waveguide guides the optic signal in way of vertically emitting an optic signal to the waveguide through an opto-electronic component. The path of the optic signal is changed by a 45-degrees incident face of the waveguide, and the optic signal is guided into the waveguide. Then, the optic signal is guided out from the waveguide by a 45-degrees outgoing face and received by the other opto-electronic component. However, such light guiding process needs to change the transmission path of the optic signal, which has a potential problem of the optic signal distortion due to energy loss and lack of alignment precision.

SUMMARY

An aspect of the present invention provides an opto-electronic circuit board. A waveguide is disposed in the opto-electronic circuit board, and a transmission of an optic signal is completed without vertically changing the optic signal. As a result, the optic signal energy loss is reduced, and a more accurate and effective signal transmission is achieved.

An aspect of the present invention provides a method of assembling an opto-electronic circuit board including the steps of (It should be understood that unless otherwise indicated, the sequence may be arranged as required. Even all or partial of the steps may be performed simultaneously.):

(1) forming a bottom cladding layer, a core layer, and a top cladding layer on a base sequentially for forming a waveguide on the base;

(2) forming a first light-guide hole at a first base material and processing the first base material thereby forming a first inserting portion;

(3) disposing a light emitter on the first base material as an emitting component;

(4) forming a second light-guide hole at a second base material and processing the second base material thereby forming a second inserting portion;

(5) disposing a light receiver on the second base material as a receiving component;

(6) forming a first cavity, a second cavity and a third cavity on a first circuit layer of a circuit substrate, in which the first cavity is located between the second cavity and the third cavity;

(7) disposing the waveguide in the first cavity, in which the base is connected to the circuit substrate; and (8) disposing the emitting component and the receiving component in the second cavity and the third cavity respectively, in which the light emitter and the light receiver align with the core layer.

In one or more embodiments, the method further including the steps of (It should be understood that unless otherwise indicated, the sequence may be arranged as required. Even all or partial of the steps may be performed simultaneously.):

(1) forming a dielectric layer on the circuit substrate, the waveguide, the emitting component, and the receiving component;

(2) forming a surface metal layer on a surface of the dielectric layer and patterning the surface metal layer to a surface circuit layer;

(3) forming at least two blind vias respectively located at two opposite sides of the emitting component and the receiving component, in which the blind vias penetrate the surface circuit layer, the dielectric layer, and a part of the circuit substrate to the first circuit layer;

(4) coating a plurality of metal layers in the blind vias; and (5) disposing at least two chips on the surface circuit layer.

In one or more embodiments, the method further including forming a first reflective layer on an inner surface of the first light-guide hole, and forming a second reflective layer on an inner surface of the second light-guide hole.

In one or more embodiments, the method further including disposing a first condenser between the waveguide and the first light-guide hole, and disposing a second condenser between the waveguide and the second light-guide hole, in which centers of the first condenser and the second condenser align with the core layer.

An aspect of the present invention provides an opto-electronic circuit board including a circuit substrate, a waveguide, an emitting component, and a receiving component. The circuit substrate includes a first circuit layer, a first cavity, a second cavity, and a third cavity. The first cavity is disposed on the first circuit layer. The second cavity is disposed on the first circuit layer and at a side of the first cavity. The third cavity is disposed on the first circuit layer and at a side of the first cavity opposite the second cavity.

In one or more embodiments, the waveguide disposed in the first cavity includes a base, a bottom cladding layer, a top cladding layer, and a core layer. The base is disposed on the first circuit layer. The bottom cladding layer is disposed on the base. The top cladding layer is disposed on the bottom cladding layer. The core layer is clad between the bottom cladding layer and the top cladding layer.

In one or more embodiments, the emitting component is disposed in the second cavity, in which the emitting component includes a first inserting portion, a first light-guide hole, a first conductive layer, and a light emitter. The first inserting portion inserts into the second cavity. The first light-guide hole aligns with the core layer of the waveguide. The first conductive layer is disposed on a surface of the emitting component and opposite the waveguide with connecting to the first circuit layer. The light emitter is disposed on the first circuit layer, in which the light emitter provides an optic signal aligning with the first light-guide such that the optic signal enters to the core layer through the first light-guide hole.

In one or more embodiments, the receiving component is disposed in the third cavity, in which the receiving component includes a second inserting portion, a second light-guide hole, a second conductive layer, and a light receiver. The second inserting portion inserts into the third cavity. The second light-guide hole aligns with the core layer of the waveguide. The second conductive layer is disposed on a surface of the receiving component and opposite the waveguide with connecting to the first circuit layer. The light receiver is disposed on the second conductive layer and aligns with the second light-guide hole for receiving the optic signal, in which the optic signal passes through the core layer and enters the light receiver via the second light-guide hole.

In one or more embodiments, the opto-electronic circuit board further includes a first reflective layer and a second reflective layer. The first reflective layer is disposed on an inner surface of the first light-guide hole, and the second reflective layer is disposed on an inner surface of the second light-guide hole.

In one or more embodiments, the opto-electronic circuit board further includes a first condenser and a second condenser, in which the first condenser is disposed between the waveguide and the first light-guide hole, and the second condenser is disposed between the waveguide and the second light-guide hole. Centers of the first condenser and the second condenser align with the core layer.

In one or more embodiments, in which the core layer is located at a connecting line between the light emitter and the light receiver.

In one or more embodiments, the opto-electronic circuit board further includes a dielectric layer, a surface circuit layer, at least one the other blind via, a first metal layer, at least one of the other blind via, and a second metal layer. The dielectric layer covers the circuit substrate, the light waveguide, the emitting component, and the receiving component. The surface circuit layer is disposed on the dielectric layer. The blind via is disposed at a side of the emitting component and penetrates the surface circuit layer and the dielectric layer to the first circuit layer. The first metal layer is disposed on an inner surface of the blind via, in which the first metal layer connects the surface circuit layer to the first circuit layer. The other blind via is disposed at a side of the receiving component and penetrates the surface circuit layer and the dielectric layer to the first circuit layer. The second metal layer is disposed on an inner surface of the other blind via, in which the second metal layer connects the surface circuit layer to the first circuit layer.

In one or more embodiments, the opto-electronic circuit board further includes a first chip and a second chip. The first chip is disposed on a part of the surface circuit layer and electrically connected to the light emitter, in which the first chip provides an electrical signal to the corresponding light emitter. The second chip is disposed on the other part of the surface circuit layer and electrically connected to the light receiver, in which the second chip receives the electrical signal transmitting from the corresponding light receiver.

The opto-electronic circuit board of the present invention is an embedded opto-electronic circuit board, and the substrate, the waveguide, the emitting component, and the receiving component of the opto-electronic circuit board are fabricated individually. Then, the above components are assembled in one after the individual fabrication. With such method, the fabricating process is speeded up, and the fabrication yield rate of each of components can be controlled individually. Furthermore, transmission of the opto-electronic circuit board of the present invention is completed without changing the light path, such that a potential problem of optic signal energy loss is reduced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1A and FIG. 1B are schematic drawings of forming a waveguide of an opto-electronic circuit board according to an embodiment of the present invention in different steps;

FIG. 1C is a cross-sectional view in FIG. 1B taken along line AA';

FIG. 2A to FIG. 2D are schematic drawings of forming an emitting component or a receiving component of an opto-electronic circuit board according to an embodiment of the present invention;

FIG. 3A and FIG. 3B are schematic drawings of processing a circuit substrate of an opto-electronic circuit board according to an embodiment of the present invention;

DETAILED DESCRIPTION

Figure 4A:
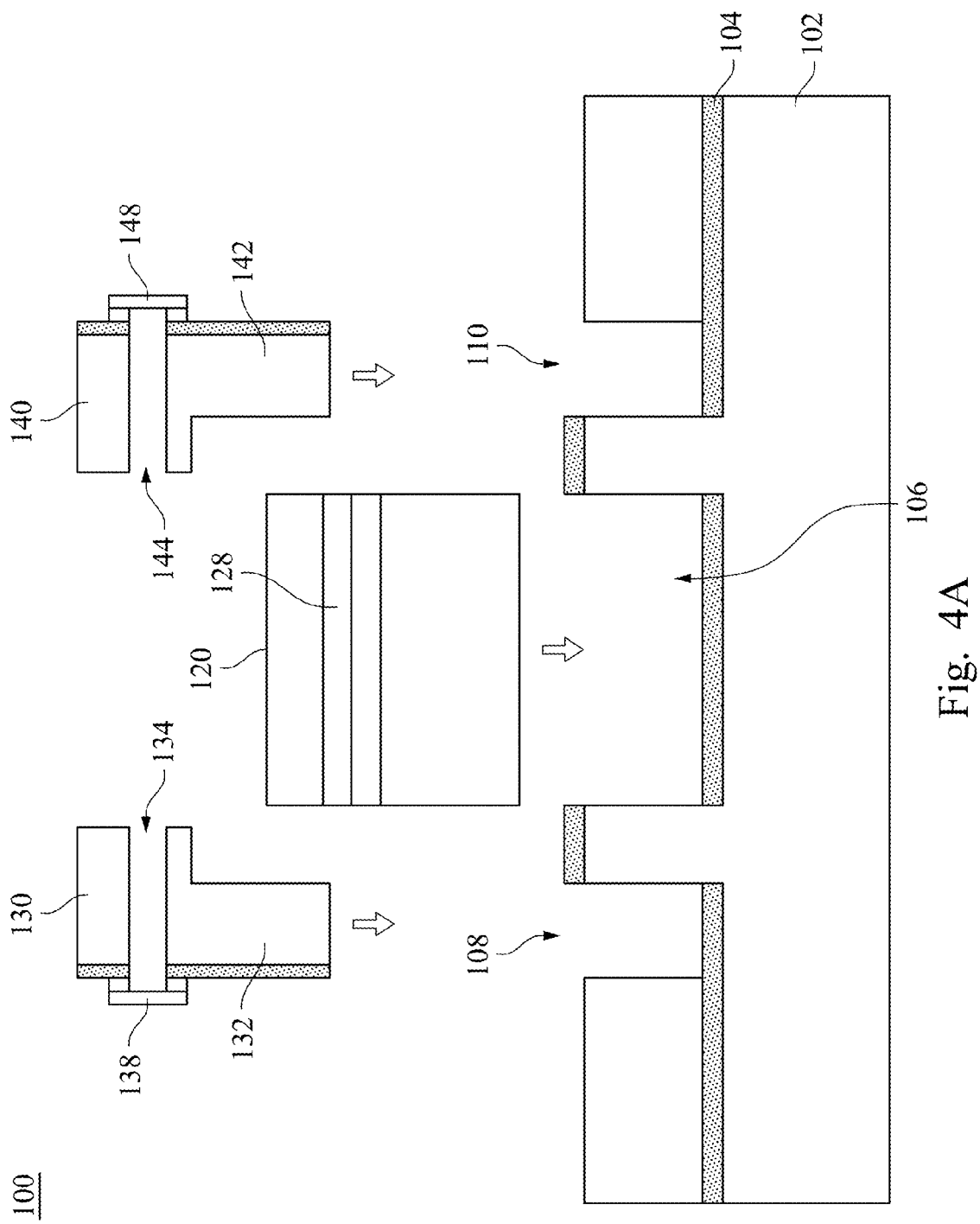
FIG. 4A is a schematic drawing of assembling an opto-electronic circuit board according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

In a conventional opto-electronic circuit board, an optic signal is guided by a waveguide. However, when the waveguide is disposed in the opto-electronic circuit board, the optic signal vertically enters the waveguide, and the optic signal is changed by a 45-degrees incident face of the waveguide and guided into the waveguide. Then, the transmission direction of the optic signal is changed again by a 45-degrees outgoing face of the waveguide, such that the optic signal can enter into a light receiver. The energy of the optic signal energy is decayed due to changing the transmission direction of the optic signal twice, and an optic signal distortion is also a potential problem.

Therefore, an aspect of the present invention provides an opto-electronic circuit board that the optic signal can enters the waveguide without changing the transmission direction, such that the problem of the optic signal distortion is reduced. In addition, the opto-electronic circuit board of the present invention board is an assembly-type opto-electronic circuit board, and thus components of the opto-electronic circuit board are assembled in one after individually fabricating each of the components. With such method, the fabricating process is speeded up, and the fabrication yield rate of each of components can be controlled individually.

An aspect of the present invention provides a method of assembling an opto-electronic circuit board including the steps of:

(1) forming a bottom cladding layer, a core layer, and a top cladding layer on a base sequentially for forming a waveguide on the base;

(2) forming a first light-guide hole at a first base material and processing the first base material thereby forming a first inserting portion;

(3) disposing a light emitter on the first base material as an emitting component;

(4) forming a second light-guide hole at a second base material and processing the second base material thereby forming a second inserting portion;

(5) disposing a light receiver on the second base material as a receiving component;

(6) forming a first cavity, a second cavity and a third cavity on a first circuit layer of a circuit substrate, in which the first cavity is located between the second cavity and the third cavity;

(7) disposing the waveguide in the first cavity, in which the base is connected to the circuit substrate; and (8) disposing the emitting component and the receiving component in the second cavity and the third cavity respectively, in which the light emitter and the light receiver align with the core layer.

Generally, the waveguide, the emitting component, the receiving component, and the circuit substrate are formed through the above steps, and then the above components are assembled in one.

However, the waveguide, the emitting component, the receiving component, and the circuit substrate are respectively fabricated during the fabrication. In other words, the sequence of the fabrication of the opto-electronic circuit board of the present invention may be changed as required. The different components can be fabricated in the same time or with various orders, and then the components are assembled in one. The fabrications of the components are further described in the following with draws.

FIG. 1A and FIG. 1B are schematic drawings of forming a waveguide of an opto-electronic circuit board according to an embodiment of the present invention in different steps. A waveguide 120 includes a base 122, a bottom cladding layer 124, a core layer 128, and a top cladding layer 126. The waveguide 120 is formed on the base 122 as shown in FIG. 1A. First, the bottom cladding layer 124 and the core layer 128 are formed on the base 122, and the top cladding layer 126 is formed on the bottom cladding layer 124 as shown in FIG. 1B. The core layer 128 is covered between the top cladding layer 126 and the bottom cladding layer 124.

According to an embodiment of the present invention, the refractive indexes of the bottom cladding layer 124 and the top cladding layer 126 are the same and less than the refractive index of the core layer 128. When a light transmits in the core layer 128 with such refractive index disposition, the total reflection is occurred at interfaces between the core layer 128 and the top cladding layer 126 and between the core layer 128 and the bottom cladding layer 124. With the total reflection, the energy loss due to outward transmitting of the light is prevented, and the light keeps transmitting in the core layer 128. In other words, the core layer 128 of the waveguide 120 can be regarded as a transmitting channel of the light.

FIG. 1C is a cross-sectional view in FIG. 1B taken along line AA'. The core layer 128 is covered between the top cladding layer 126 and the bottom cladding layer 124. The shape of the core layer 128 along the horizontal direction is about a pillar shape, and the light travels in the core layer 128 with such pillar shape.

The core layer 128, the top cladding layer 126 and the bottom cladding layer 124 are made of resin, polymethyl-methacrylate (PMMA), polyimide (PI) or combinations thereof, in which the core layer 128, the top cladding layer 126 and the bottom cladding layer 124 can formed through coating process, dry film process, lithography or combinations thereof.

FIG. 2A to FIG. 2D are schematic drawings of forming an emitting component or a receiving component of an opto-electronic circuit board according to an embodiment of the present invention. An emitting component and a receiving component are formed through processing a base material 178, and the present embodiment is an example of forming the emitting component.

As shown in FIG. 2A, the base material 178 includes a first conductive layer 136 disposed on a surface. After processing the base material 178, a first light-guide hole 134 penetrating the base material 178 is formed, as shown in FIG. 2B. Then, the base material 178 is formed to a specific shape, such that a first inserting portion 132 is formed, as shown in FIG. 2C. Finally, an opto-electronic component is disposed on the first conductive layer 136, as shown in FIG. 2D. When assembling the emitting component, the opto-electronic component is a light emitter 138, and the light emitter 138 aligns with the first light-guide hole 134 as shown in FIG. 2D. Conversely, if the assembly is forming the receiving component, the opto-electronic component is a light receiver.

FIG. 3A and FIG. 3B are schematic drawings of processing a circuit substrate of an opto-electronic circuit board according to an embodiment of the present invention. A circuit substrate 102 is a multi-layer circuit board or a resin coated copper (RCC). The circuit substrate 102 includes a first circuit layer 104, a second circuit layer 105, and a dielectric layer 103 disposed between the first circuit layer 104 and the second circuit layer 105, in which the circuit substrate 102 of the present embodiment is a multi-layer circuit board. Parts of the second circuit layer 105 are removed by lithography and the circuit substrate 102 is processed, such that a first cavity 106, a second cavity 108, and a third cavity 110 are formed in the circuit substrate 102.

The dielectric layer 103 is penetrated by the first cavity 106, the second cavity 108, and the third cavity 110, in which the second cavity 108 and the third cavity 110 are disposed at opposite sides of the first cavity 106. The second cavity 108 is formed at a side of the first cavity 106, and the third cavity 110 is formed at the other side of the first cavity 106.

According to an embodiment of the present invention, the depths of the first cavity 106, the second cavity 108, and the third cavity 110 formed by processing are approximately the same. In addition, after the first cavity 106, the second cavity 108, and the third cavity 110 are formed, the partial first circuit layer 104 of the circuit substrate 102 is exposed.

According to an embodiment of the present invention, an opto-electronic circuit board of the present invention board is an assembly-type opto-electronic circuit board, and thus components of the opto-electronic circuit board are assembled in one after individually fabricating of each of the components. The fabrication of each of the components are described above, and a method for assembling the opto-electronic circuit board is described in the following.

FIG. 4A is a schematic drawing of assembling an opto-electronic circuit board according to a first embodiment of the present invention. In the present embodiment, an opto-electronic circuit board 100 includes a circuit substrate 102, a waveguide 120, an emitting component 130, and a receiving component 140. The circuit substrate 102 includes a first circuit layer 104 and a second circuit layer, and a first cavity 106, a second cavity 108, and a third cavity 110 have already been formed on the circuit substrate 102.

The waveguide 120 is inserted into the first cavity 106 along a direction of an arrow, in which the size of the waveguide 120 corresponds with the first cavity 106 for inserting. In addition, in order to prevent a loose disposition of the waveguide 120, the size of the waveguide 120 may not be much less than the first cavity 106.

The emitting component 130 is inserted into the second cavity 108 along a direction of an arrow. The size of the emitting component 130 corresponds with the second cavity 108, such that a first inserting portion 132 of the emitting component 130 can insert into the second cavity 108. After the emitting component 130 is inserted into the second cavity 108, a light emitter 138 of the emitting component 130 aligns with a core layer 128 of the waveguide 120 through a first light-guide hole 134.

The receiving component 140 is inserted into the third cavity 110 along a direction of an arrow. The size of the receiving component 140 corresponds with the third cavity 110, such that a second inserting portion 142 of the receiving component 140 can insert into the third cavity 110. After the receiving component 140 is inserted into the third cavity 110, a light receiver 148 of the receiving component 140 aligns with the core layer 128 of the waveguide 120 through a second light-guide hole 144.

According to an embodiment of the present invention, after the opto-electronic circuit board 100 is assembled, the core layer 128 of the waveguide 120 is located at a connecting line between the light emitter 138 and the light receiver 148. In other words, the core layer 128, the light emitter 138, and the light receiver 148 are located at the same plane, in which the plane is parallel with the circuit substrate 102.

Figure 4B:
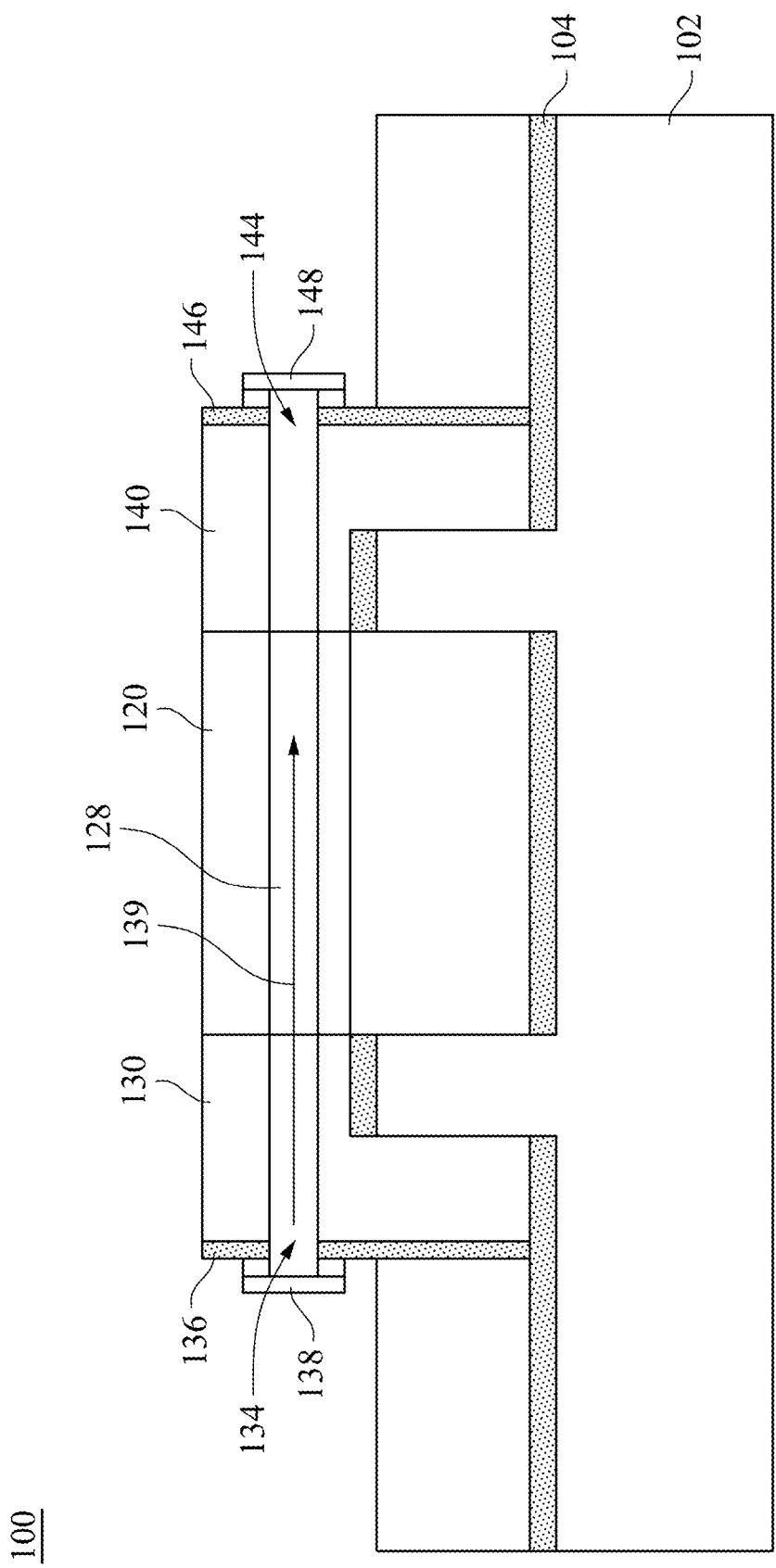
FIG. 4B is a schematic drawing after assembling the opto-electronic circuit board in FIG. 4A.

FIG. 4B is a schematic drawing after assembling the opto-electronic circuit board in FIG. 4A. The emitting component 130 includes the first light-guide hole 134, a first conductive layer 136, and the light emitter 138, in which the first light-guide hole 134 aligns with the core layer 128 of the waveguide 120. The first conductive layer 136 is disposed on a surface of the emitting component 130 and opposite a side of the waveguide 120, in which the first conductive layer 136 is connected to the first circuit layer 104.

The light emitter 138 is disposed on the first conductive layer 136, and the light emitter 138 is used for converting an inputting electrical signal into an optic signal and outputting the optic signal. In an embodiment of the present invention, the light emitter 138 provides an optic signal 139 with aligning with the first light-guide hole 134, and the first light-guide hole 134 aligns with the core layer 128 such that the optic signal 139 enters the core layer 128 through the first light-guide hole 142.

The receiving component 140 includes the second light-guide hole 144, a second conductive layer 146, and the light receiver 148, in which the second light-guide hole 144 aligns with the core layer 128 of the waveguide 120. The second conductive layer 146 is disposed on a surface of the receiving component 140 and opposite a side of the waveguide 120, in which the second conductive layer 146 is connected to the first circuit layer 104.

The light receiver 148 is disposed on the second conductive layer 146, and the light receiver 148 is used for converting an inputting optic signal into an electrical signal and outputting the electrical signal. In an embodiment of the present invention, the light receiver 148 aligns a second light-guide hole 144 for receiving the optic signal 139, and the second light-guide hole 144 aligns with the core layer 128 such that the optic signal 139 enters the light receiver 148 through the second light-guide hole 144. In other words, the optic signal 139 passes through the core layer 128 and enters the light receiver 148 via the second light-guide hole 144.

The core layer 128 is located at a connecting line between the light emitter 138 and the light receiver 148. In other words, the core layer 128, the light emitter 138, and the light receiver 148 are located at the same plane, in which the plane is parallel with the circuit substrate 102.

When the light emitter 138 receives the electrical signal, the light emitter 138 provides the optic signal 139. The optic signal 139 travels from the first light-guide hole 134 through the core layer 128 and the second light-guide hole 144, and reaches the light receiver 148. After the light receiver 148 receives the optic signal 139, the light receiver 148 converts the optic signal 139 into an electrical signal and outputs the electrical signal.

In addition, for making the description succinct, only one core layer 128, one light emitter 138, and one light receiver 148 of the opto-electronic circuit board 100 are illustrated in FIG. 4B. However, a person having ordinary skill in the art may choose the proper number of the core layer 128, the light emitter 138, and the light receiver 148 as required.

In the following embodiment, the descriptions are made to discuss the variations of the first embodiment, and hence the same components of the first embodiment are not described again.

The opto-electronic circuit board of the present invention is formed through an assembling method of the other embodiment, in which the assembling method follows finishing assembling the waveguide, the emitting component, the receiving component, and the circuit substrate. The assembling method of the other embodiment includes the steps of:

(1) forming a dielectric layer on the circuit substrate, the waveguide, the emitting component, and the receiving component;

(2) forming a surface metal layer on a surface of the dielectric layer and patterning the surface metal layer to a surface circuit layer;

(3) forming at least two blind vias respectively located at two opposite sides of the emitting component and the receiving component, in which the blind vias penetrate the surface circuit layer, the dielectric layer, and a part of the circuit substrate to the first circuit layer;

(4) coating a plurality of metal layers in the blind vias; and (5) disposing at least two chips on the surface circuit layer.

Figure 5A:
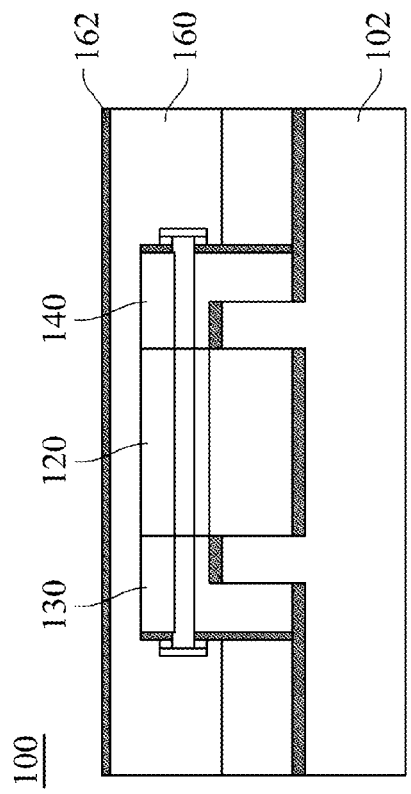
FIG. 5A to FIG. 5D are schematic drawings of assembling an opto-electronic circuit board according to the other embodiment of the present invention.
Figure 5B:
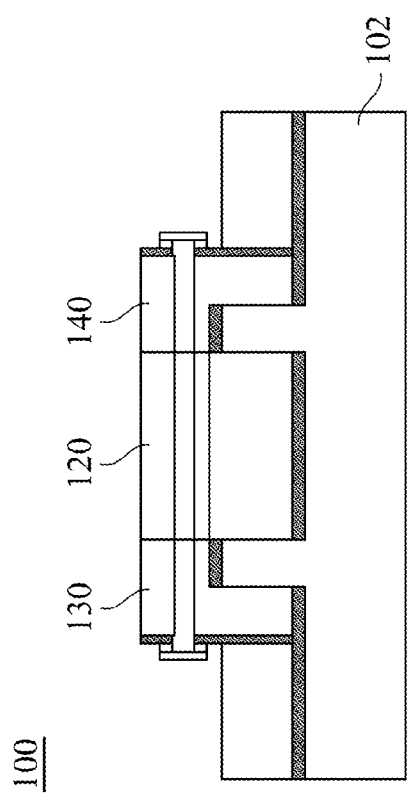

The assembling method is further described in the following with draws. FIG. 5A to FIG. 5D are schematic drawings of assembling an opto-electronic circuit board according to the other embodiment of the present invention. As shown in FIG. 5, a waveguide 120, an emitting component 130, a receiving component 140, and a circuit substrate 102 of an opto-electronic circuit board 100 have been already assembled in one. Then, a dielectric material is provided such that a dielectric layer 160 is formed, and the circuit substrate 102, the waveguide 120, the emitting component 130, and the receiving component 140 are covered with the dielectric layer 160. As shown in FIG. 5B, a metal layer 162 is formed on a surface of the dielectric layer 160.

Figure 5C:
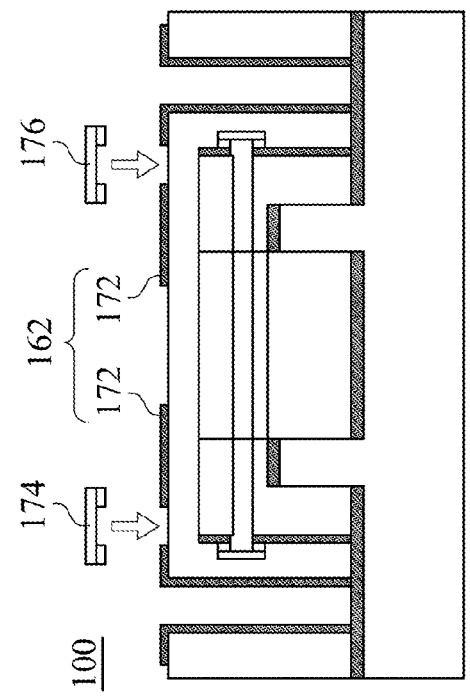

Then, a surface of the metal layer 162 is patterned for forming a surface circuit layer 172, and the surface circuit layer 172, the dielectric layer 160, and the partial circuit substrate 102 are penetrated such that a first blind via 164 and a second blind via 168 are formed on a first circuit layer 104. A first metal layer 166 and a second metal layer, are respectively disposed on inner surfaces of the first blind via 170 and the second blind via 168, such that the surface circuit layer 172 and the first circuit layer 104 are electrically connected through the first metal layer 166 and the second metal layer 166 as shown in FIG. 5C.

Figure 5D:
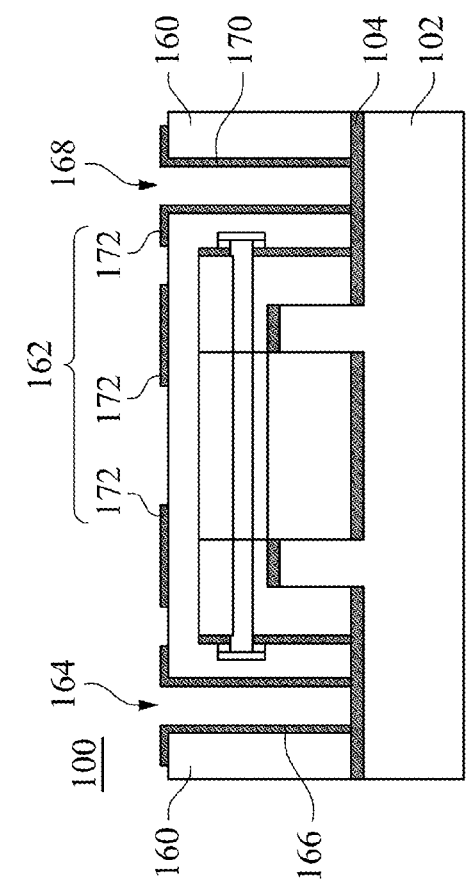

As shown in FIG. 5D, a first chip 174 is disposed on the partial surface circuit layer 172 along a direction of an arrow. A second chip 176 is disposed on the partial surface circuit layer 172 along a direction of an arrow, and the assembly of the opto-electronic circuit board 100 is completed.

In the following embodiment, the descriptions are made to discuss the function of the components of the opto-electronic circuit board 100 assembled according to the above method, and hence the same fabrication and assembly of the components are not described again.

Figure 6:
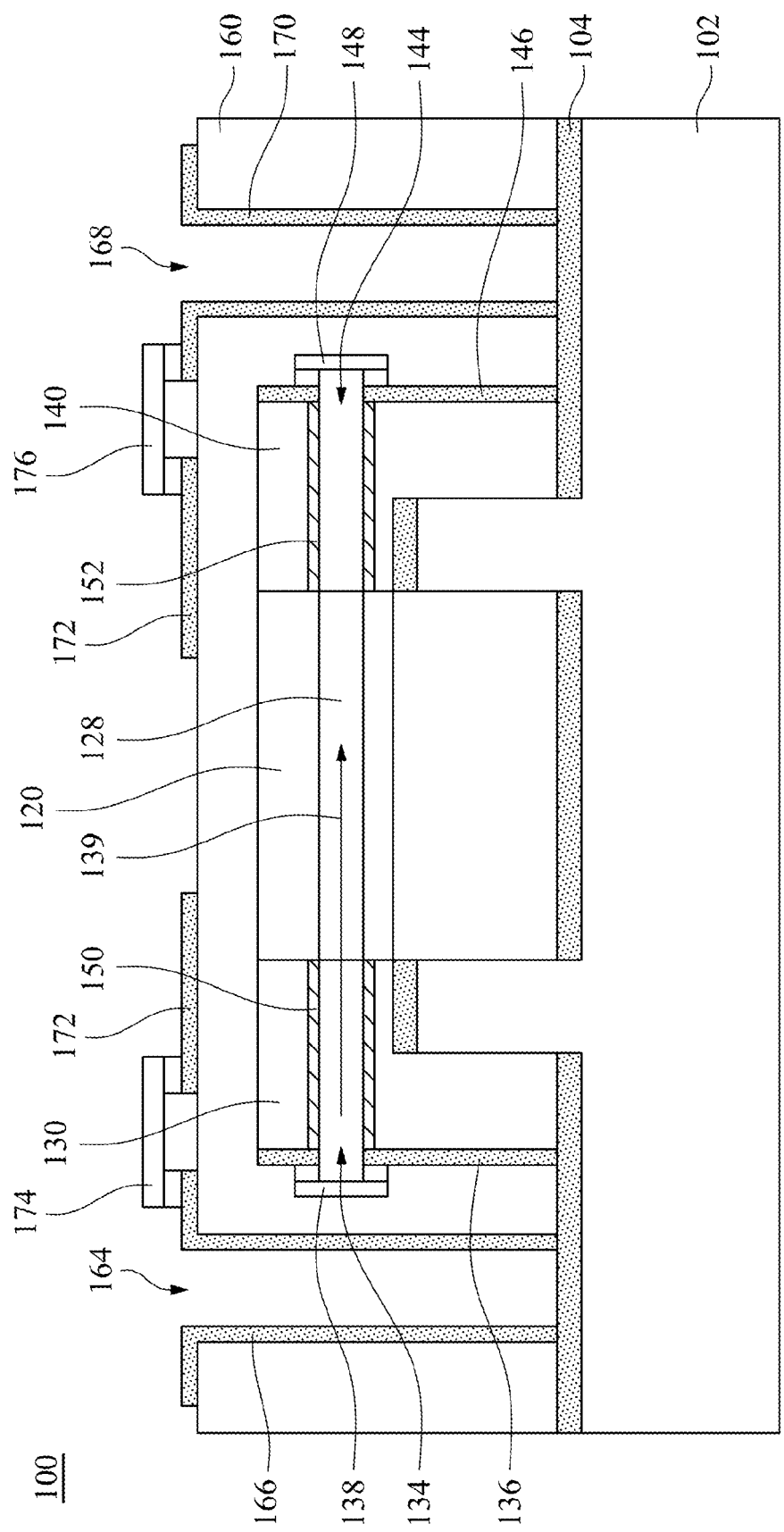
FIG. 6 is a side view of an opto-electronic circuit board according to a second embodiment of the present invention.

FIG. 6 is a side view of an opto-electronic circuit board according to a second embodiment of the present invention. An opto-electronic circuit board 100 includes a circuit substrate 102, a waveguide 120, an emitting component 130, a receiving component 140, a dielectric layer 160, a surface circuit layer 172, a first blind via 164, a first metal layer 166, a second blind via 168, a second metal layer 170, a first chip 174, and a second chip 176.

A first reflective layer 150 is disposed on an inner surface of a first light-guide hole 134 of the emitting component 130, and a second reflective layer 152 is disposed on an inner surface of a second light-guide hole 144 of the receiving component 140. The first reflective layer 150 and the second reflective layer 152 are made of a material of gold, copper, nickel, silver, zinc, chromium, tin, aluminum or metal combinations thereof.

The first reflective layer 150 and the second reflective layer 152 are respectively formed in the fabrications of forming the emitting component 130 and the receiving component 140. For example, in the fabrication of forming the emitting component 130, after the first light-guide hole 134 is formed (see FIG. 2B), the first reflective layer 150 is disposed on the inner surface of the first light-guide hole 134.

In the present embodiment, when an optic signal 139 passes through the first light-guide hole 134, the first reflective layer 150 can reduce the energy loss of the optic signal 139. Similarly, when the optic signal 139 passes through the second light-guide hole 144, the second reflective layer 152 also can reduce the energy loss of the optic signal 139.

The dielectric layer 160 is disposed on the circuit substrate 102, the waveguide 120, the emitting component 130, and the receiving component 140. The dielectric layer 160 is used for covering the waveguide 120, the emitting component 130, and the receiving component 140. In other words, the embedded depth of above components of the opto-electronic circuit board 100 is defined by the thick of the dielectric layer 160. However, a person having ordinary skill in the art may choose a proper thick of the dielectric layer 160 as required.

The first blind via 164 is disposed at a side of the emitting component 130, and the first blind via 164 penetrates from the surface circuit layer 172 through the dielectric layer 160 and the partial circuit substrate 102 to the first circuit layer 104. The first metal layer 166 is disposed on an inner surface of the first blind via 164, and the first metal layer 166 connects the surface circuit layer 172 to the first circuit layer 104.

The second blind via 168 is disposed at a side of the receiving component 140, and the second blind via 168 penetrates from the surface circuit layer 172 through the dielectric layer 160 and the partial circuit substrate 102 to the first circuit layer 104. The second metal layer 170 is disposed on an inner surface of the second blind via 168, and the second metal layer 170 connects the surface circuit layer 172 to the first circuit layer 104.

According to an embodiment, a first conductive layer 136, the first circuit layer 104, the first metal layer 166, and the partial surface circuit layer 172 belong to a first electrical connection set. A second conductive layer 146, the first circuit layer 104, the second metal layer 170, and the other partial surface circuit layer 172 belong to a second electrical connection set. Because the surface circuit layer 172 is a discontinuous arrangement, the first electrical connection set and the second electrical connection set cannot directly transmit an electrical signal to each other.

The first chip 174 is disposed on the partial surface circuit layer 172 and belongs to the first electrical connection set. The second chip 176 is disposed on the partial surface circuit layer 172 and belongs to the second electrical connection set.

According to an embodiment of the present invention, the first chip 174 sends an electrical signal to the light emitter 138 through the first electrical connection set. When the light emitter 138 receives the electrical signal, the light emitter 138 provides an optic signal 139. The optic signal 139 is guided by the waveguide 120 and received by the light receiver 148. The light receiver 148 converts the optic signal 139 into an electrical signal and outputs the electrical signal, and the electrical signal is received by the second chip 176 through the second electrical connection. Through the above transmission, though the first chip 174 and the second chip 176 cannot directly transmit an electrical signal to each other, the first chip 174 can complete the signal transmission with the second chip 176 via the optic signal 139.

In addition, because the light emitter 138, the light receiver 148, and the core layer 128 are located at the same connecting line and the energy loss of the optic signal 139 is reduced by the disposition of the first reflective layer 150 and the second reflective layer 152, the opto-electronic circuit board 100 has an effect of reducing the energy loss of the optic signal 139.

Figure 7:
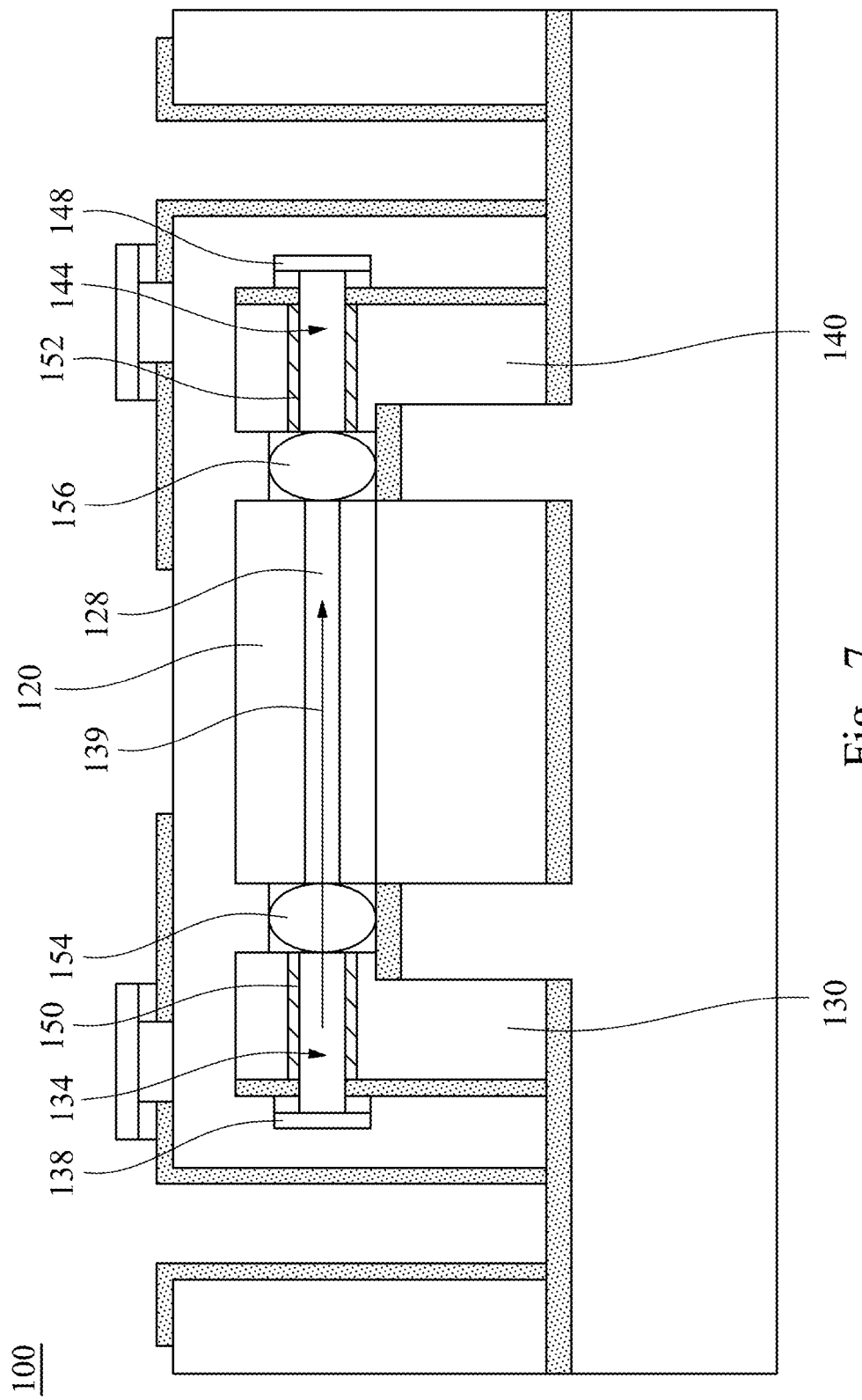
FIG. 7 is a side view of an opto-electronic circuit board according to a third embodiment of the present invention.

FIG. 7 is a side view of an opto-electronic circuit board according to a third embodiment of the present invention. A first condenser 154 is disposed between an emitting component 130 and a waveguide 120, and a second condenser 156 is disposed between a receiving component 140 and the waveguide 120. In other words, the first condenser 154 is disposed between the waveguide 120 and the first light-guide hole 134, and the second condenser 156 is disposed between the waveguide 120 and the second light-guide hole 144. A first reflective layer 150 is disposed on an inner surface of the first light-guide hole 134, and a second reflective layer 152 is disposed on an inner surface of the second light-guide hole 144.

The first condenser 154 and the second condenser 156 provide a focusing effect for an optic signal 139. After a light emitter 138 emits the optic signal 139 to the first condenser 154 through the first light-guide hole 134, the optic signal 139 enters a core layer 128 with focusing on the core layer 128. Similarly, after the optic signal 129 passes through the core layer 128, the optic signal 139 is focused on a light receiver 148 by the second condenser 156 and received by the light receiver 148 through the second light-guide hole 144. According to an embodiment of the present invention, centers of the first condenser 154 and the second condenser 156 align with the core layer 128, such that the centers of the first condenser 154 and the second condenser 156 and the core layer 128 are disposed at the same connecting line.

The sizes of the emitting component 130 and the receiving component 140 of an opto-electronic circuit board 100 are adjusted with the disposition of the first condenser 154 and the second condenser 156. For example, in the fabrication of forming the emitting component 130, a person having ordinary skill in the art may choose a proper thick of the base material (see FIG. 2A) according to the sizes of the first condenser 154 and the second condenser 156. Therefore, a defect due to the unsuitable sizes of the first condenser 154 and the second condenser 156 is prevented in the assembly of the opto-electronic circuit board 100.

In the present embodiment, the first condenser 154 and the second condenser 156 make the optic signal 139 have a better property of being aligned with the core layer 128, and the first reflective layer 150 and the second reflective layer 152 can reduce the energy loss of the optic signal 139 during the transmission. When the first condenser 154, the second condenser 156, the first reflective layer 150, and the second reflective layer 152 are disposed at the same time, the energy loss of optic signal 139 of the opto-electronic circuit board 100 of the present invention can be reduced and the optic signal 139 has the better property of alignment.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of assembling an opto-electronic circuit board, comprising:
   forming a bottom cladding layer, a core layer, and a top cladding layer on a base sequentially for forming a waveguide on the base;
   forming a first light-guide hole at a first base material and processing the first base material thereby forming a first inserting portion;
   disposing a light emitter on the first base material as an emitting component;
   forming a second light-guide hole at a second base material and processing the second base material thereby forming a second inserting portion;
   disposing a light receiver on the second base material as a receiving component;
   forming a first cavity, a second cavity and a third cavity on a first circuit layer of a circuit substrate, wherein the first cavity is located between the second cavity and the third cavity;
   disposing the waveguide in the first cavity, wherein the base is connected to the circuit substrate; and
   disposing the emitting component and the receiving component in the second cavity and the third cavity respectively, wherein the light emitter and the light receiver align with the core layer.

2. The method of claim 1, further comprising:
   forming a dielectric layer on the circuit substrate, the waveguide, the emitting component, and the receiving component;
   forming a surface metal layer on a surface of the dielectric layer and patterning the surface metal layer to a surface circuit layer;
   forming at least two blind vias respectively located at two opposite sides of the emitting component and the receiving component, wherein the blind vias penetrate the surface circuit layer, the dielectric layer, and a part of the circuit substrate to the first circuit layer;
   coating a plurality of metal layers in the blind vias; and
   disposing at least two chips on the surface circuit layer.

3. The method of claim 1, further comprising:
   forming a first reflective layer on an inner surface of the first light-guide hole, and forming a second reflective layer on an inner surface of the second light-guide hole.

4. The method of claim 1, further comprising:
   disposing a first condenser between the waveguide and the first light-guide hole, and disposing a second condenser between the waveguide and the second light-guide hole, wherein centers of the first condenser and the second condenser align with the core layer.

5. An opto-electronic circuit board, comprising:
   a circuit substrate comprising:
      a first circuit layer;
      a first cavity disposed on the first circuit layer;
      a second cavity disposed on the first circuit layer and at a side of the first cavity; and
      a third cavity disposed on the first circuit layer and at a side of the first cavity opposite the second cavity;
   a waveguide disposed in the first cavity and comprising:
      a base disposed on the first circuit layer;
      a bottom cladding layer disposed on the base;
      a top cladding layer disposed on the bottom cladding layer; and
      a core layer which is clad between the bottom cladding layer and the top cladding layer;
   an emitting component disposed in the second cavity, wherein the emitting component comprises:
      a first inserting portion inserting into the second cavity;
      a first light-guide hole aligning with the core layer of the waveguide;
      a first conductive layer disposed on a surface of the emitting component and opposite the waveguide with connecting to the first circuit layer; and
      a light emitter disposed on the first circuit layer, wherein the light emitter provides an optic signal aligning with the first light-guide such that the optic signal enters to the core layer through the first light-guide hole; and
   a receiving component disposed in the third cavity, wherein the receiving component comprises:
      a second inserting portion inserting into the third cavity;
      a second light-guide hole aligning with the core layer of the waveguide;
      a second conductive layer disposed on a surface of the receiving component and opposite the waveguide with connecting to the first circuit layer; and
      a light receiver disposed on the second conductive layer and aligning with the second light-guide hole for receiving the optic signal, wherein the optic signal passes through the core layer and enters the light receiver via the second light-guide hole.

6. The opto-electronic circuit board of claim 5, further comprising a first reflective layer disposed on an inner surface of the first light-guide hole, and a second reflective layer disposed on an inner surface of the second light-guide hole.

7. The opto-electronic circuit board of claim 5, further comprising a first condenser and a second condenser, wherein the first condenser is disposed between the waveguide and the first light-guide hole, the second condenser is disposed between the waveguide and the second light-guide hole, and centers of the first condenser and the second condenser align with the core layer.

8. The opto-electronic circuit board of claim 5, wherein the core layer is located at a connecting line between the light emitter and the light receiver.

9. The opto-electronic circuit board of claim 5, further comprising:
- a dielectric layer covering on the circuit substrate, the light waveguide, the emitting component, and the receiving component;
- a surface circuit layer disposed on the dielectric layer;
- at least one blind via disposed at a side of the emitting component and penetrating the surface circuit layer and the dielectric layer to the first circuit layer;
- a first metal layer disposed on an inner surface of the blind via, wherein the first metal layer connects the surface circuit layer to the first circuit layer;
- at least one the other blind via disposed at a side of the receiving component and penetrating the surface circuit layer and the dielectric layer to the first circuit layer; and
- a second metal layer disposed on an inner surface of the other blind via, wherein the second metal layer connects the surface circuit layer to the first circuit layer.

10. The opto-electronic circuit board of claim 9, further comprising:
- a first chip disposed on a part of the surface circuit layer and electrically connected to the light emitter, wherein the first chip provides an electrical signal to the corresponding light emitter; and
- a second chip disposed on the other part of the surface circuit layer and electrically connected to the light receiver, wherein the second chip receives the electrical signal transmitting from the corresponding light receiver.

* * * * *